United States Patent
Chen et al.

(10) Patent No.: US 11,916,270 B2
(45) Date of Patent: Feb. 27, 2024

(54) ACTIVE FAULT-TOLERANT TEMPERATURE CONTROL METHOD FOR PROTON EXCHANGE MEMBRANE FUEL CELL SYSTEM

(71) Applicant: ZHEJIANG UNIVERSITY, Hangzhou (CN)

(72) Inventors: Jian Chen, Hangzhou (CN); Chizhou Yan, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 507 days.

(21) Appl. No.: 17/311,700

(22) PCT Filed: Apr. 1, 2020

(86) PCT No.: PCT/CN2020/082646
§ 371 (c)(1),
(2) Date: Jun. 8, 2021

(87) PCT Pub. No.: WO2020/200214
PCT Pub. Date: Oct. 8, 2020

(65) Prior Publication Data
US 2022/0029184 A1 Jan. 27, 2022

(30) Foreign Application Priority Data
Apr. 2, 2019 (CN) .......................... 201910261414.2

(51) Int. Cl.
*H01M 8/04992* (2016.01)
*H01M 8/04701* (2016.01)

(52) U.S. Cl.
CPC ... *H01M 8/04992* (2013.01); *H01M 8/04701* (2013.01)

(58) Field of Classification Search
CPC ......... H01M 8/04992; H01M 8/04701; H01M 8/04313; H01M 8/04664; H01M 8/04671;
(Continued)

(56) References Cited

U.S. PATENT DOCUMENTS

2006/0063048 A1* 3/2006 Kolodziej ......... H01M 8/04992
429/430
2018/0131021 A1* 5/2018 Li ....................... H01M 8/0494

FOREIGN PATENT DOCUMENTS

CN          107317045          * 11/2017

OTHER PUBLICATIONS

CN107317045 English translation. Wu et al. China. Nov. 3, 2017. (Year: 2017).*

* cited by examiner

*Primary Examiner* — Christopher P Domone
(74) *Attorney, Agent, or Firm* — Bayramoglu Law Offices LLC

(57) ABSTRACT

An active fault-tolerant temperature control method for a proton exchange membrane fuel cell system is disclosed. Firstly, a model of a proton exchange membrane fuel cell temperature control system is established, and a system structure matrix is established according to the model by structural analysis. The system structure matrix is decomposed by using a Dulmage-Mendelsohn method, a redundant part of the model is obtained, and a system residual is constructed to reflect faults of the temperature control system. On the basis of fault identification, sliding-mode-based active fault-tolerant control is designed to accurately control an outlet temperature of a stack. The new method solves the problem of sensor failure of a temperature control model of the proton exchange membrane fuel cell system during operation, and applies model-based fault-tolerant control to (Continued)

temperature control, so that the reliability and durability of the fuel cell system can be effectively improved.

6 Claims, 3 Drawing Sheets

(58) Field of Classification Search
CPC ......... H01M 8/04679; H01M 8/04298; H01M 8/0432
See application file for complete search history.

US 11,916,270 B2

ACTIVE FAULT-TOLERANT TEMPERATURE CONTROL METHOD FOR PROTON EXCHANGE MEMBRANE FUEL CELL SYSTEM

CROSS REFERENCE TO THE RELATED APPLICATIONS

This application is the national phase entry of International Application No. PCT/CN2020/082646, filed on Apr. 1, 2020, which is based upon and claims priority to Chinese Patent Application No. 201910261414.2, filed on Apr. 2, 2019, the entire contents of which are incorporated herein by reference.

TECHNICAL FIELD

The present invention belongs to a fuel cell system control method in the field of fuel cell applications, and in particular relates to an active fault-tolerant temperature control method for a proton exchange membrane fuel cell system.

BACKGROUND

Due to environmental pollution and the energy crisis, new energy sources led by proton exchange membrane fuel cells are being paid more and more attention. Fuel cells have the advantage of having high power density, high conversion efficiency, no pollution, and the like, and have been increasingly applied to a distributed generation, new energy vehicles, energy storage, and other fields. However, according to the annual report released by the U.S. department of energy, the economy and durability of the fuel cells have not fully reached commercial indicators. Stack manufacturing process and system control are important means to realize its commercialization, and temperature control is an important factor affecting the performance of a stack. A large amount of heat may be generated during actual operation of the stack, and an excessive temperature may lead to membrane dryness and affect the activity of the membrane. Too low of a temperature may cause flooding which affects the efficiency of the stack. Improper temperature control may affect the performance of the stack, and conversely, a fault of the stack or an auxiliary system may also affect the temperature control. Active fault-tolerant control is fault-tolerant control based on fault diagnosis. The fault diagnosis is divided into two categories: model-based fault diagnosis and data-based fault diagnosis. The data-based fault diagnosis requires a lot of data training and lacks certain robustness. The model-based fault diagnosis requires the establishment of an accurate mathematical model but has better robustness. Temperature control is an important research field of fuel cell control. Existing research achievements include proportional integral derivative (PID) control, feedforward control, model predictive control, fuzzy control, and the like. However, the above methods do not take into account the system faults, and the control accuracy is not high, so there are certain limitations during an actual operation. Based on the above, the research on active model-based fault-tolerant temperature control for proton exchange membrane fuel cells is of great value.

SUMMARY

In order to solve the problems in the prior art, the present invention provides an active fault-tolerant temperature control method for a proton exchange membrane fuel cell system, in which a redundant part of a model is obtained by structural analysis and Dulmage-Mendelsohn decomposition, so as to generate a system residual to diagnose a sensor fault, and fault-tolerant temperature control for the proton exchange membrane fuel cell system is realized using sliding-mode-based active fault-tolerant control, which improves the robustness of a temperature control system.

The technical solution adopted by the present invention includes the following steps:

S1: establishing a fuel cell system temperature control model;

S2: establishing a system structure matrix by a structural analysis method (Krysander M, Åslund J, Frisk E. A structural algorithm for finding testable sub-models and multiple fault isolability analysis[C]/21st International Workshop on Principles of Diagnosis (DX-10), Portland, Oregon, USA. 2010: 17-18.);

establishing, for the fuel cell system temperature control model by the structural analysis method, the system structure matrix whose horizontal axis is unknown system variables and vertical axis is system equations; and for any element in the system structure matrix, if a system equation of the vertical axis corresponding to a matrix element includes an unknown system variable of the horizontal axis corresponding to the matrix element, marking the matrix element as 1, and otherwise, as 0;

S3: decomposing the system structure matrix by using a Dulmage-Mendelsohn method, wherein the decomposed system structure matrix is presented as an upper triangle shape; obtaining a redundant part of the decomposed system structure matrix, wherein the redundant part is a region where a number of the system equations is greater than a number of the unknown variables in the decomposed system structure matrix; constructing a residual in the redundant part, detecting a fault of a sensor in the fuel cell system temperature control model online through the residual: if the residual is below a set threshold, the sensor in the fuel cell system temperature control model does not fail, and if the residual is above the set threshold, the sensor in the fuel cell system temperature control model fails; and S4: designing, on the basis of the sensor fault identification in step S3, an active fault-tolerant control structure based on a sliding mode controller, to realize fault-tolerant control over a fuel cell outlet temperature.

The fuel cell system temperature control model in step S1 includes a fuel cell temperature model, a stack voltage model, and a semi-empirical model of an auxiliary system;

1) establishing the following fuel cell temperature model according to the energy conservation law and the thermodynamic principle;

$$M_{st}C_{st}\frac{dT_{st,out}}{dt} = \dot{Q}_{fuel} + \dot{Q}_{in} - \dot{Q}_{out} - \dot{Q}_{elec} - \dot{Q}_{cl} - \dot{Q}_{loss}$$

Where $M_{st}$ denotes mass of a stack, $C_{st}$ denotes a thermal capacity of the stack; $T_{st,out}$ denotes a temperature of the stack, which is an outlet temperature of stack cooling water; $\dot{Q}_{fuel}$ denotes chemical energy brought in by reactants in the stack, $\dot{Q}_{in}$ denotes energy brought in by input gases in the stack, $\dot{Q}_{out}$ denotes energy taken out by output gases, $\dot{Q}_{elec}$ denotes load output power in the stack, $\dot{Q}_{cl}$ denotes energy taken away by the stack cooling water, and $\dot{Q}_{loss}$ denotes heat dissipation of the stack;

the stack is short for fuel cell stack;

2) establishing the stack voltage model according to the principle of electrochemistry (Wu X, Zhou B. Fault tolerance control for proton exchange membrane fuel cell systems[J]. Journal of Power Sources, 2016, 324: 804-829.);

3) establishing the semi-empirical model of the auxiliary system for the auxiliary system;

the auxiliary system includes a radiator and a pump connected to the stack, and the semi-empirical model includes a pump model and a radiator model;

the pump model is obtained by fitting a pump voltage $V_{pump}$ with a flow rate $W_{cl}$, with a specific form as follows:

$$W_{cl} = 0.044 V_{pump}^3 - 0.37 V_{pump}^2 + 3.2 V_{pump} - 3.05$$

the radiator model is obtained by fitting a radiator outlet temperature difference $T_{diff}$, a flow rate $W_{cl}$, a fan speed $\omega$, and room temperature $T_0$, with a specific form as follows:

$$\dot{T}_{diff} = \frac{10 \cdot F_1(\omega) - T_{diff} - F_2(T_0)}{-2.5 W_{cl} + 27.5}$$

Where $F_1(\omega)$ denotes a non-linear conversion function of the fan speed $\omega$, and is defined as follows:

$$F_1(\omega) = \begin{cases} 0 & \omega \in (0, 0.5) \\ \omega & \omega \in [0.5, 1) \end{cases}$$

$F_2(T_0)$ denotes an empirical heat-dissipation function, and is defined as follows:

$$F_2(T_0) = (T_0 - 25)/\ln(T_0/25) - 25$$

Due to a high response speed of the auxiliary system, transient response can be ignored compared with a large lag time of the fuel cell temperature, and the semi-empirical model of the auxiliary system is obtained by least square fitting.

In step S2, the system equations include all model equations in the fuel cell temperature model, the stack voltage model, and the semi-empirical model of the auxiliary system; and the unknown system variables include all time-varying variables in the equations of the fuel cell temperature model, the stack voltage model, and the semi-empirical model of the auxiliary system.

In step S3, the residual is obtained, for an unknown system variable, by obtaining an analytical solution of the corresponding unknown system variable through a system equation, and subtracting the analytical solution and a corresponding sensor value. The sensor in the fuel cell system temperature control model is a sensor of a stack inlet temperature, a stack outlet temperature, a cooling water flow rate, a fan outlet temperature, and a stack voltage.

The active fault-tolerant control structure in step S4 mainly includes a sliding mode controller, a fault detection module, and a control module; the fault detection module judges, according to temperature, pressure, volume or mass flow rate, and voltage parameters in the fuel cell system temperature control model, whether the sensor in the model fails, after the fault detection module detects that the sensor in the model fails, the control module reconstructs, according to the fuel cell system temperature control model, a sensor signal indicative of a fault and feeds it back to the sliding mode controller, and finally, the sliding mode controller realizes the fault-tolerant control over the fuel cell outlet temperature by feedback.

The sliding mode controller is established according to the fuel cell system temperature control model, input of the sliding mode controller is a fuel cell set temperature, output of the sliding mode controller is a cooling water flow rate, and the cooling water flow rate serves as a control variable of the sliding mode controller; a sliding mode surface of the sliding mode controller is designed according to the fuel cell system temperature control model, and a smoothed switching function is adopted to prevent the pump from oscillating; and in consideration of an excessive overshoot effect caused by an integral effect in the sliding mode controller, integral separation and anti-integral saturation methods are added to the sliding mode surface to accelerate system response capability and stability.

The present invention has the following advantages:

The present invention solves the problem of sensor failure of a proton exchange membrane fuel cell temperature control system during operation, and applies a model-based fault-tolerant control method to temperature control, so that the reliability and durability of the fuel cell system can be effectively improved.

DETAILED DESCRIPTION OF THE EMBODIMENTS

The present invention is described in detail below with reference to the accompanying drawings and specific embodiments.

Figure 5:
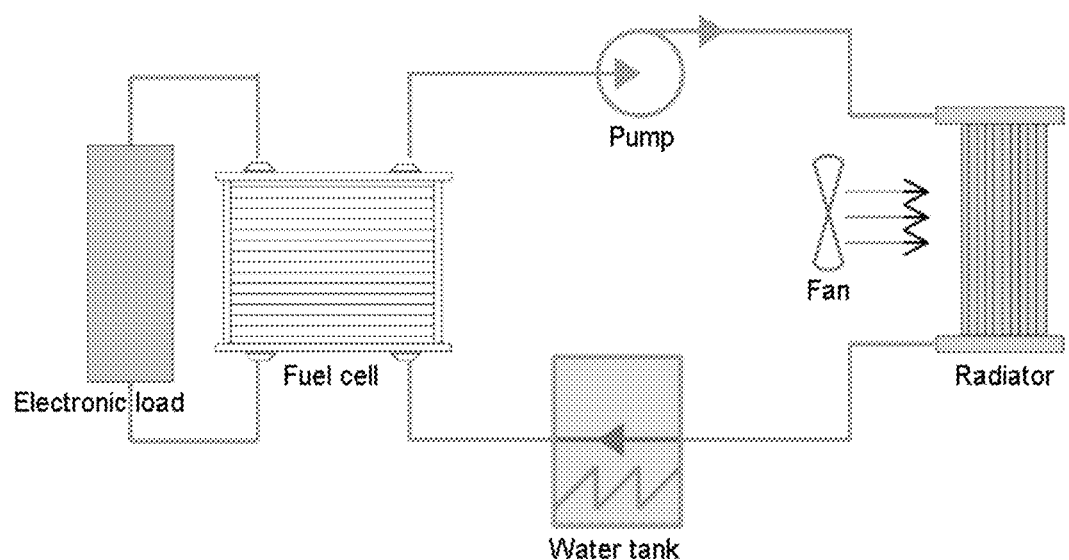
FIG. 5 is a diagram showing proton exchange membrane fuel cell apparatus of the present invention.

As shown in FIG. 5, in the left circuit, an electronic load is connected to a fuel cell and provides a load for the fuel cell. In the right circuit, water flows into a radiator through a pump, and a fan provides a cooling air flow for the radiator. The water passes through a water tank and is eventually injected into the fuel cell to dissipate heat.

An active model-based fault-tolerant temperature control method for proton exchange membrane fuel cells includes the following steps:

S1: A fuel cell system temperature control model is established.

The fuel cell system temperature control model in step S1 includes a fuel cell temperature model, a stack voltage model, and a semi-empirical model of an auxiliary system.

1) The following fuel cell temperature model is established according to the energy conservation law and the thermodynamic principle:

$$M_{st} C_{st} \frac{dT_{st,out}}{dt} = \dot{Q}_{fuel} + \dot{Q}_{in} - \dot{Q}_{out} - \dot{Q}_{elec} - \dot{Q}_{cl} - \dot{Q}_{loss}$$

Where $M_{st}$ denotes mass of a stack, $C_{st}$ denotes a thermal capacity of the stack; $T_{st,out}$ denotes a temperature of the stack, which is an outlet temperature of stack cooling water; fuel denotes chemical energy brought in by reactants in the stack, $\dot{Q}_{in}$ denotes energy brought in by input gases in the stack, $\dot{Q}_{out}$ denotes energy taken out by output gases, $\dot{Q}_{elec}$ denotes load output power in the stack, $\dot{Q}_{cl}$ denotes energy taken away by the stack cooling water, and $\dot{Q}_{loss}$ denotes heat dissipation of the stack.

2) The stack voltage model is established according to the principle of electrochemistry (Wu X, Zhou B. Fault tolerance control for proton exchange membrane fuel cell systems[J]. Journal of Power Sources, 2016, 324: 804-829.).

3) The semi-empirical model of the auxiliary system is established for the auxiliary system.

The auxiliary system includes a radiator and a pump connected to the stack, and the semi-empirical model includes a pump model and a radiator model.

The pump model is obtained by fitting a pump voltage $V_{pump}$ with a flow rate $W_{cl}$, with a specific form as follows:

$$W_{cl} = 0.044 V_{pump}^3 - 0.37 V_{pump}^2 + 3.2 V_{pump} - 3.05$$

The radiator model is obtained by fitting a radiator outlet temperature difference $T_{diff}$, a flow rate $W_{cl}$, a fan speed $\omega$, and room temperature $T_0$, with a specific form as follows:

$$\dot{T}_{diff} = \frac{10 \cdot F_1(\omega) - T_{diff} - F_2(T_0)}{-2.5 W_{cl} + 27.5}$$

Where $F_1(\omega)$ denotes a non-linear conversion function of the fan speed $\omega$, and is defined as follows:

$$F_1(\omega) = \begin{cases} 0 & \omega \in (0, 0.5) \\ \omega & \omega \in [0.5, 1) \end{cases}$$

$F_2(T_0)$ denotes an empirical heat-dissipation function, and is defined as follows:

$$F_2(T_0) = (T_0 - 25)/\ln(T_0/25) - 25$$

Due to a high response speed of the auxiliary system, transient response can be ignored compared with a large lag time of the fuel cell temperature, and the semi-empirical model of the auxiliary system is obtained by least square fitting.

S2: A system structure matrix is established by a structural analysis method.

The system structure matrix is established by the structural analysis method (Krysander M, Aslund J, Frisk E. A structural algorithm for finding testable sub-models and multiple fault isolability analysis[C]/21st International Workshop on Principles of Diagnosis (DX-10), Portland, Oregon, USA. 2010: 17-18.). For the fuel cell system temperature control model by the structural analysis method, the system structure matrix whose horizontal axis is unknown system variables and vertical axis is system equations is established. For any element in the system structure matrix, if a system equation of the vertical axis corresponding to a matrix element includes an unknown system variable of the horizontal axis corresponding to the matrix element, the matrix element is marked as 1, and otherwise, as 0.

In step S2, the system equations include all model equations in the fuel cell temperature model, the stack voltage model, and the semi-empirical model of the auxiliary system; and the unknown system variables include all time-varying variables in the equations of the fuel cell temperature model, the stack voltage model, and the semi-empirical model of the auxiliary system, such as chemical energy, internal energy, volume or mass flow rate, voltage, and pressure.

S3: The system structure matrix in step S2 is decomposed by using a Dulmage-Mendelsohn method, so as to obtain a redundant part, and a system residual is constructed in the redundant part to identify a sensor fault in the model.

Figure 1:
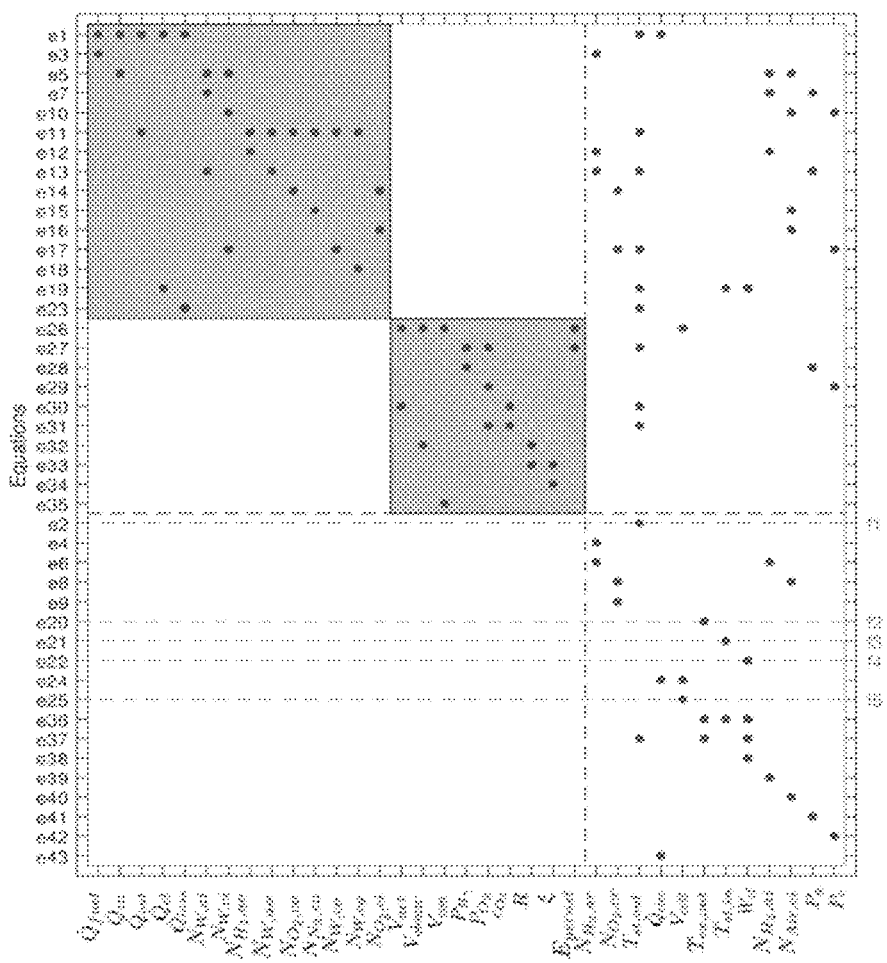
FIG. 1 shows a structural matrix obtained after Dulmage-Mendelsohn decomposition in the present invention.

3.1) The system structure matrix is decomposed by using the Dulmage-Mendelsohn method, and the decomposed system structure matrix is, as shown in FIG. 1, presented as an upper triangular shape. The upper triangle shape is a form in which all below a main diagonal in the system structure matrix are zero.

In the vertical axis of FIG. 1, the system equation e1 is an energy conservation equation, e2 is a theoretical exothermic equation, e3 is a theoretical hydrogen consumption equation, e4 is an input internal energy equation, e5 is an input hydrogen equation, e6 is an anode input saturated vapor equation; e7 is an input air equation, e8 is a theoretical oxygen consumption equation, e9 is a cathode input saturated vapor equation, e10 is an output internal energy equation, e11 is an output hydrogen equation, e12 is an anode output saturated vapor equation, e13 is an oxygen output equation, e14 is a nitrogen output equation, e15 is an oxygen input equation, e16 is a cathode output saturated vapor equation, e17 is a reaction-generated water equation, e18 is a cooling water heat dissipation equation, e19 is a fuel cell heat dissipation equation, e20 is a battery load equation, e21 is a voltage equation, e22 is a Nernst equation, e23 is a hydrogen partial-pressure equation, e24 is an oxygen partial-pressure equation, e25 is an activation loss equation, e26 is an oxygen concentration equation, e27 an ohmic loss equation, e28 is an internal resistance equation, e29 is an internal resistance identification equation, e30 is a concentration loss equation, e31 is a water tank equation, e32 is a radiator equation, e33 is a pump equation, e34 is a fuel cell outlet temperature sensor fault equation, e35 is a radiator outlet temperature sensor fault equation, e36 is a fuel cell inlet temperature sensor fault equation, e37 is a flow sensor fault equation, e38 is a voltage sensor fault equation, e39 is a hydrogen flow sensor equation, e40 is an air flow sensor equation, e41 is an anode pressure sensor equation, e42 is a cathode pressure sensor equation, and e43 is a load sensor equation.

In the horizontal axis of FIG. 1, the unknown variable $\dot{Q}_{fuel}$ denotes reaction theory exothermic, $\dot{Q}_{in}$ denotes input internal energy, $\dot{Q}_{out}$ denotes output internal energy, $\dot{Q}_{cl}$ denotes cooling water heat dissipation, $\dot{Q}_{loss}$ denotes fuel cell heat dissipation, $N_{W,ai}$ denotes an anode input saturated vapor quantity, $N_{W,ci}$ denotes a cathode input saturated vapor quantity, $N_{H_2,ao}$ denotes an anode output hydrogen flow rate, $N_{W,ao}$ denotes an anode output saturated vapor flow rate, $N_{O_2,co}$ denotes a cathode output oxygen flow rate, $N_{N_2,co}$ denotes a cathode output nitrogen flow rate, $N_{W,cg}$ denotes a cathode-generated water quantity, $N_{O_2,ci}$ denotes a cathode input oxygen flow rate, $V_{act}$ denotes an activation loss, $V_{ohmic}$ denotes an ohmic loss, $V_{con}$ denotes a concentration loss, $P_{H_2}$ denotes a hydrogen partial pressure, $P_{O_2}$ denotes an oxygen partial pressure, $c_{O_2}$ denotes an oxygen concentration, R denotes an ohmic internal resistance, $\xi$ denotes an ohmic internal resistance parameter, $E_{nernst}$ denotes a Nernst voltage, $N_{H_2,ar}$ denotes reaction-consumed hydrogen, $N_{O_2,cr}$ denotes reaction-consumed oxygen, $T_{st,out}$ denotes a fuel cell outlet temperature, $\dot{Q}_{ele}$ denotes a load power, $V_{cell}$ denotes a fuel cell voltage, $T_{ex,out}$ denotes a radiator outlet temperature, $T_{st,in}$ denotes a fuel cell inlet temperature, $W_{cl}$ denotes a cooling water flow rate, $N_{H_2,ai}$ denotes an anode input hydrogen flow rate, $N_{Air,ci}$ denotes a cathode input air flow rate, $P_a$ denotes an anode pressure, and $P_c$ denotes a cathode pressure.

3.2) A redundant part of the decomposed system structure matrix is obtained, which is the lower right part of the matrix in FIG. 1. The redundant part is a region where a number of the system equations is greater than a number of the unknown variables in the decomposed system structure matrix.

3.3) A residual is constructed in the redundant part. The residual is obtained, for an unknown system variable, by obtaining an analytical solution of the corresponding unknown system variable through a system equation, and subtracting the analytical solution and a corresponding sensor value. A fault of a sensor in the fuel cell system temperature control model is detected online through the residual: if the residual is below a set threshold, the sensor in the fuel cell system temperature control model does not fail, and if the residual is above the set threshold, the sensor in the fuel cell system temperature control model fails.

The sensor in the fuel cell system temperature control model is a sensor of a stack inlet temperature, a stack outlet temperature, a cooling water flow rate, a fan outlet temperature, and a stack voltage. The five dashed lines in the lower part of the matrix in FIG. 1 represent five sensor faults, namely, the stack inlet temperature, the stack outlet temperature, the cooling water flow rate, the fan outlet temperature, and the stack voltage. Since all the faults are located in the redundant part of the model and separated from each other, the faults can be detected and do not interfere with each other, that is, fault isolation.

S4: Based on the sensor fault identification in step S3, an active fault-tolerant control structure based on a sliding mode controller is designed to realize fault-tolerant control over the fuel cell outlet temperature.

The active fault-tolerant control structure in step S4 mainly includes the sliding mode controller, a fault detection module, and a control module. The fault detection module judges, according to temperature, pressure, volume or mass flow rate, and voltage parameters in the fuel cell system temperature control model, whether the sensor in the model fails. After the fault detection module detects that the sensor in the model fails, the control module reconstructs, according to the fuel cell system temperature control model, a sensor signal indicative of a fault and feeds it back to the sliding mode controller, and finally, the sliding mode controller realizes the fault-tolerant control over the fuel cell outlet temperature by feedback.

Embodiment

The validity of the fault-tolerant control strategy is verified by experiments, which are classified into a normal experiment and a fault experiment. Experiments are carried out on a 3-kW proton exchange membrane fuel cell experimental platform, and a fuel cell used has 18 single cells.

Figure 2:
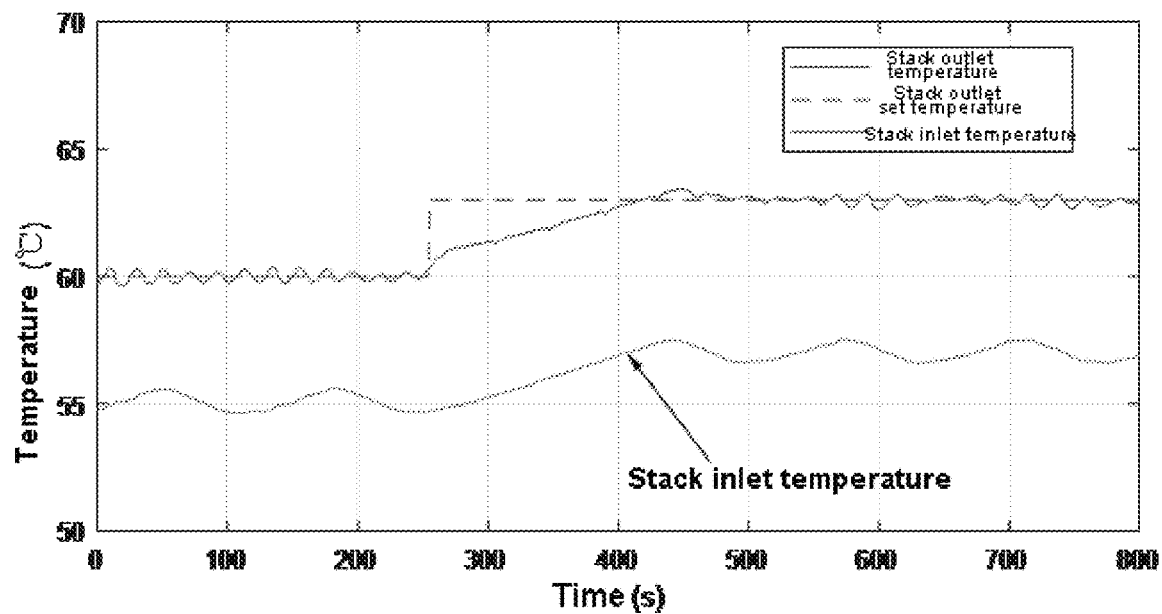
FIG. 2 shows experimental results of set temperature changes in a normal state according to an embodiment of the present invention.
Figure 3:
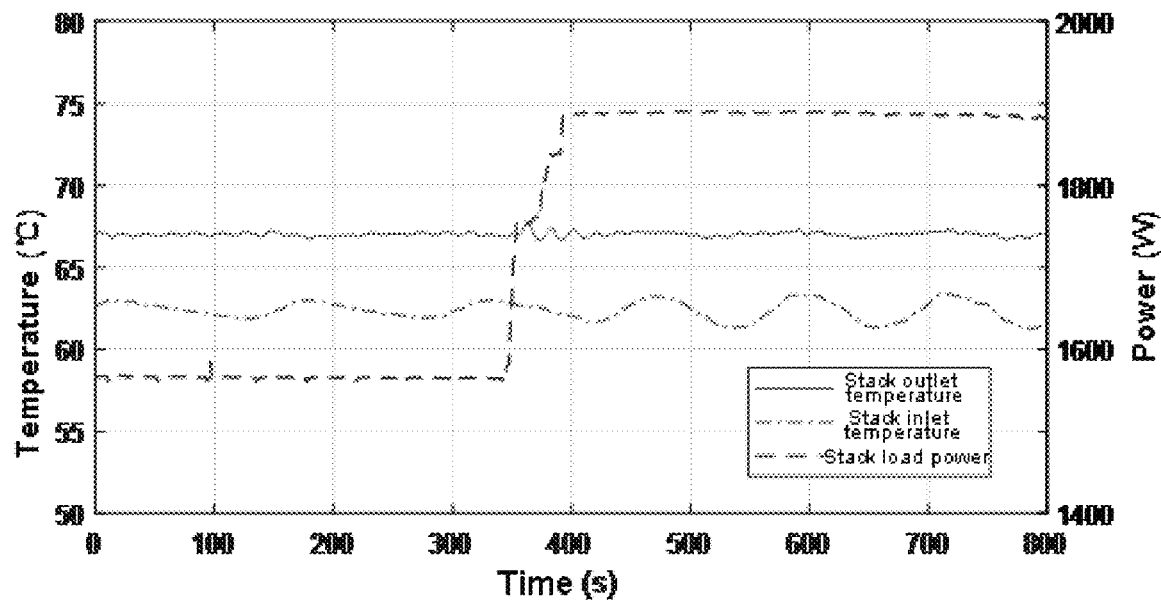
FIG. 3 shows experimental results of load power changes in a normal state according to an embodiment of the present invention.

In the normal experiment, high control precision and better robustness of a fuel cell temperature controller are demonstrated. As shown in FIG. 2, when a set temperature changes, the fuel cell outlet temperature can track the set temperature, and the control accuracy is within ±0.5° C. Thanks to the integral separation and anti-integral saturation, there is no large overshoot when a step of the set temperature occurs, which improves the stability of the controller. The performance of the controller under load variation is shown in FIG. 3. System load changes lead to heat production changes inside the stack, but the controller can well suppress changes in the stack outlet temperature.

Figure 4:
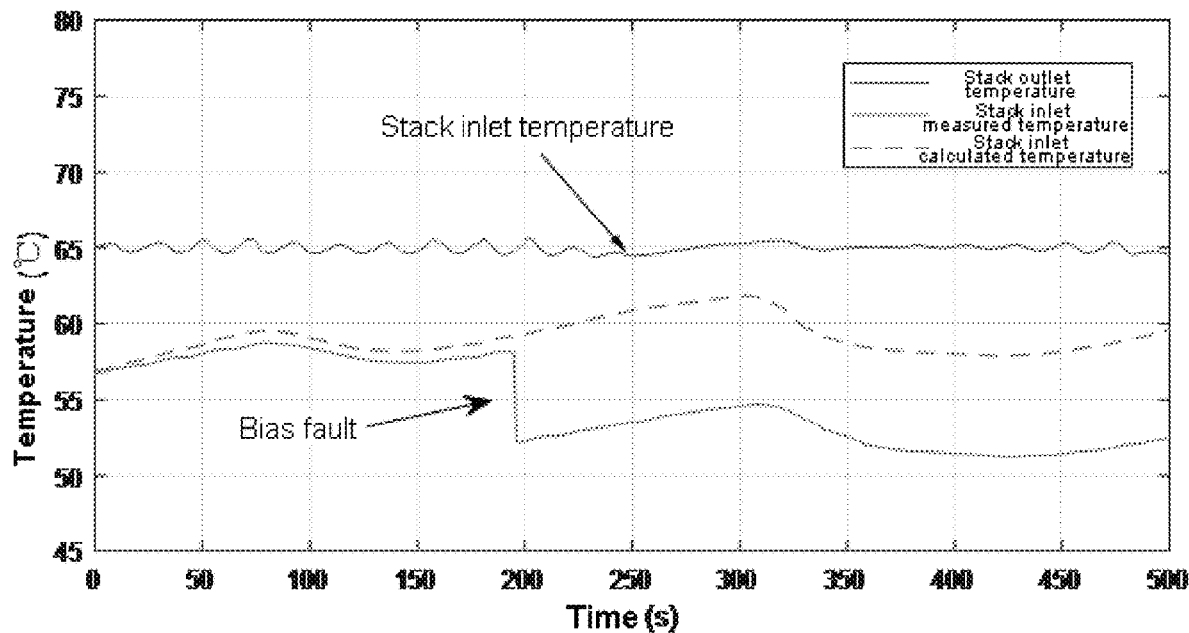
FIG. 4 shows experimental results of temperature control in a fault state according to an embodiment of the present invention.

In the fault experiment, a bias fault is added to a fuel cell inlet temperature sensor to detect an effect of a fault-tolerant controller. As shown in FIG. 4, the fault is added in about 200 seconds, and a fault acquisition module calculates a system residual corresponding to the fault. After the system residual exceeds a threshold, a sensor fault is determined, and a reconstructed sensor signal is input to the sliding mode controller for fault-tolerant control. The experimental results show that the controller still accurately controls the outlet temperature precisely at the set value even if an inlet sensor temperature deviates.

What is claimed is:
1. An active fault-tolerant temperature control method for a proton exchange membrane fuel cell system, comprising the following steps:
S1: establishing a fuel cell system temperature control model;
S2: establishing a system structure matrix by a structural analysis method;
establishing, for the fuel cell system temperature control model by the structural analysis method, the system structure matrix, wherein a horizontal axis of the system structure matrix is unknown system variables and a vertical axis of the system structure matrix is system equations; and for one element in the system structure matrix, when a system equation of the system equations of the vertical axis corresponding to a matrix element comprises an unknown system variable of the unknown system variables of the horizontal axis corresponding to the matrix element, marking the matrix element as 1, and otherwise, marking the matrix element as 0;
S3: decomposing the system structure matrix by using a Dulmage-Mendelsohn method to obtain a decomposed system structure matrix, wherein the decomposed system structure matrix is presented as an upper triangle shape; obtaining a redundant part of the decomposed system structure matrix, wherein the redundant part is a region, and a number of the system equations is greater than a number of the unknown system variables in the region in the decomposed system structure matrix; constructing a residual in the redundant part, detecting a fault of a sensor in the fuel cell system temperature control model online through the residual: when the residual is below a set threshold, the sensor in the fuel cell system temperature control model does not fail, and when the residual is above the set threshold, the sensor in the fuel cell system temperature control model fails; and
S4: designing, on the basis of a sensor fault identification in step S3, an active fault-tolerant control structure based on a sliding mode controller, to realize fault-tolerant control over a fuel cell outlet temperature.

2. The active fault-tolerant temperature control method for the proton exchange membrane fuel cell system according to claim 1, wherein the fuel cell system temperature control model in step S1 comprises a fuel cell temperature model, a stack voltage model, and a semi-empirical model of an auxiliary system;
1) establishing the following fuel cell temperature model according to an energy conservation law and a thermodynamic principle;

$$M_{st}C_{st}\frac{dT_{st,out}}{dt} = \dot{Q}_{fuel} + \dot{Q}_{in} - \dot{Q}_{out} - \dot{Q}_{elec} - \dot{Q}_{cl} - \dot{Q}_{loss}$$

wherein, $M_{st}$ denotes mass of a stack, $C_{st}$ denotes a thermal capacity of the stack; $T_{st,out}$ denotes a temperature of the stack, and the temperature is an outlet temperature of stack cooling water; $\dot{Q}_{fuel}$ denotes chemical energy brought in by reactants in the stack, $\dot{Q}_{in}$ denotes energy brought in by input gases in the stack, $\dot{Q}_{out}$ denotes energy taken out by output gases, $\dot{Q}_{elec}$ notes load output power in the stack, $\dot{Q}_{cl}$ denotes energy taken away by the stack cooling water, and $\dot{Q}_{loss}$ denotes heat dissipation of the stack;

the stack is an abbreviation of a fuel cell stack;

2) establishing the stack voltage model according to a electrochemistry principle; and 3) establishing the semi-empirical model of the auxiliary system for the auxiliary system;

the auxiliary system comprises a radiator and a pump connected to the stack, and the semi-empirical model comprises a pump model and a radiator model; and the pump model is obtained by fitting a pump voltage $V_{pump}$ with a flow rate $W_{cl}$, with a specific form as follows:

$$W_{cl} = 0.044 V_{pump}^3 - 0.37 V_{pump}^2 + 3.2 V_{pump} - 3.05$$

wherein, the radiator model is obtained by fitting a radiator outlet temperature difference $T_{diff}$, a flow rate $W_{cl}$, a fan speed $\omega$, and room temperature $T_0$, with a specific form as follows:

$$\dot{T}_{diff} = \frac{10 \cdot F_1(\omega) - T_{diff} - F_2(T_0)}{-2.5W_{cl} + 27.5}$$

wherein, $F_1(\omega)$ denotes a non-linear conversion function of the fan speed $\omega$, and the $F_1(\omega)$ is defined as follows:

$$F_1(\omega) = \begin{cases} 0 & \omega \in (0, 0.5) \\ \omega & \omega \in [0.5, 1) \end{cases}$$

$F_2(T_0)$ denotes an empirical heat-dissipation function, and the $F_2(T_0)$ is defined as follows:

$$F_2(T_0) = (T_0 - 25)/\ln(T_0/25) - 25$$

3. The active fault-tolerant temperature control method for the proton exchange membrane fuel cell system according to claim 2, wherein in step S2, the system equations comprise all model equations in the fuel cell temperature model, the stack voltage model, and the semi-empirical model of the auxiliary system; and the unknown system variables comprise all time-varying variables in equations of the fuel cell temperature model, the stack voltage model, and the semi-empirical model of the auxiliary system.

4. The active fault-tolerant temperature control method for the proton exchange membrane fuel cell system according to claim 1, wherein in step S3, the sensor in the fuel cell system temperature control model is the sensor of a stack inlet temperature, a stack outlet temperature, a cooling water flow rate, a fan outlet temperature, and a stack voltage.

5. The active fault-tolerant temperature control method for the proton exchange membrane fuel cell system according to claim 1, wherein the active fault-tolerant control structure in step S4 mainly comprises the sliding mode controller, a fault detection module, and a control module; the fault detection module judges, according to parameters of a temperature, a pressure, a volume or a mass flow rate, and a voltage in the fuel cell system temperature control model, whether the sensor in the fuel cell system temperature control model fails, after the fault detection module detects that the sensor in the fuel cell system temperature control model fails, the control module reconstructs, according to the fuel cell system temperature control model, a sensor signal indicative of a fault and feeds the sensor signal back to the sliding mode controller, and finally, the sliding mode controller realizes the fault-tolerant control over the fuel cell outlet temperature by feedback.

6. The active fault-tolerant temperature control method for the proton exchange membrane fuel cell system according to claim 5, wherein the sliding mode controller is established according to the fuel cell system temperature control model, an input of the sliding mode controller is a fuel cell set temperature, an output of the sliding mode controller is a cooling water flow rate, and the cooling water flow rate serves as a control variable of the sliding mode controller; a sliding mode surface of the sliding mode controller is designed according to the fuel cell system temperature control model, and a smoothed switching function is adopted to prevent a pump from oscillating; and due to an excessive overshoot effect caused by an integral effect in the sliding mode controller, integral separation and anti-integral saturation methods are added to the sliding mode surface to accelerate system response capability and stability.

\* \* \* \* \*